INVENTOR.
Albert J. Sobey
BY
Paul Fitzpatrick
ATTORNEY

United States Patent Office 3,006,145
Patented Oct. 31, 1961

3,006,145
ANTISURGE CONTROL USING COMPRESSOR BLEED
Albert J. Sobey, Indianapolis, Ind., assignor to General Motors Corporation, Detroit, Mich., a corporation of Delaware
Filed Oct. 14, 1959, Ser. No. 846,469
7 Claims. (Cl. 60—39.29)

My invention relates to controls for gas turbine engines and specifically to a control system for a compressor bleed valve or valves. The invention is applicable to gas turbine engines of either the shaft drive or jet type.

Modern gas turbine engines ordinarily have a compressor of fairly high ratio, perhaps eight to twelve, which discharges through a combustion apparatus and a turbine nozzle into a turbine which drives the compressor. The compressor is matched with the turbine so that the compressor is operated near its most efficient operating point under the operating conditions for which the engine is primarily designed. The first stage turbine nozzle is ordinarily of fixed area and flow through it is choked. The relation between compressor discharge pressure and air flow from the compressor therefore is determined by nozzle area and the temperature of the gas flowing through the nozzle, which in turn depends largely upon engine fuel flow. The best operating point of a multi-stage compressor ordinarily is very close to the surge line, that is, the line representing the relation between compressor pressure ratio and corrected compressor speed at which flow through the compressor tends to break down. Therefore, the compressor will be pushed above the surge line under off-design conditions such as low speed of the compressor, or by addition of fuel to accelerate the engine or increase its power output, unless some means is provided to modify the compressor characteristics and thus prevent surge.

While some engines have employed variable vanes in the compressor to modify its characteristics for off-design operating conditions, the use of compressor bleeds is more common. A compressor bleed vents a portion of the air flowing through the compressor. Such bleeds may be provided at a particular stage of the compressor or at more than one stage. In a particular commercial turbo-prop engine with a fourteen-stage compressor, bleeds are provided at the fifth, tenth, and fourteenth stages. The provision of compressor bleeds is an expedient to maintain satisfactory operation of the engine during low speed operation and during speed or power increases of the engine. Such bleeds should not be open at any time when they are not required or to any greater extent than is necessary, because blowing off air from the compressor is wasteful of power unless only such an amount of bleeding takes places as is necessary for the engine to operate satisfactorily.

Simple compressor bleed systems ordinarily include bleed valves which are either fully open or fully closed and which in most cases are open during low speed operation of the engine and close at some point in or below the normal operating range of speed.

My U.S. Patent No. 2,941,354, issued June 21, 1960, describes a compressor bleed arrangement for a turbo-jet engine in which a compressor bleed is open during low speed operation of the engine, is progressively closed as the speed increases through a range of perhaps 10% of the normal rated speed of the engine, and remains closed during the higher speed range of operation of the engine. In the system of that application, the actuation of the bleed valve is responsive to corrected speed of the engine, which may be represented as $N/\sqrt{\theta}$, where N is rotational speed of the compressor and $\theta$ is the ratio of the absolute ambient temperature to standard ambient temperature.

The bleed control system of my present invention is an improvement upon that disclosed in the prior application in that the operation of the bleed valve is made responsive to other factors in addition to corrected speed so that the bleed valve opening follows the requirements of the engine much more closely than with the prior system. The bleed valve is controlled not only by corrected compressor rotor speed, but also by acceleration of the compressor rotor, by means responsive to rapid changes in engine fuel flow, or by both. The means responsive to rapid fuel flow changes may respond directly to movements of the pilot's power control lever which acts, through the engine fuel control, to determine the fuel rate of the engine.

A more accurate control of the bleeds may thus be maintained. The imminence of surge, which is the reason for opening the bleeds, depends not only upon speed of the compressor but also upon acceleration and upon changes in engine fuel flow. The operating characteristics of the compressor during acceleration are not the same as during constant speed operation. As previously stated, a change in the fuel supplied to the engine immediately changes the resistance to flow in the compressor outlet by varying the temperature of the combustion products flowing through the choked first stage turbine nozzle.

The principal objects of the invention are to improve the operation of gas turbine engines and to provide a compressor bleed control system better adapted to the requirements of such engines than those presently known.

The nature of the invention and the advantages thereof will be clearly apparent to those skilled in the art from the accompanying drawings and the succeeding description of the preferred embodiment of the invention.

Figure 1:
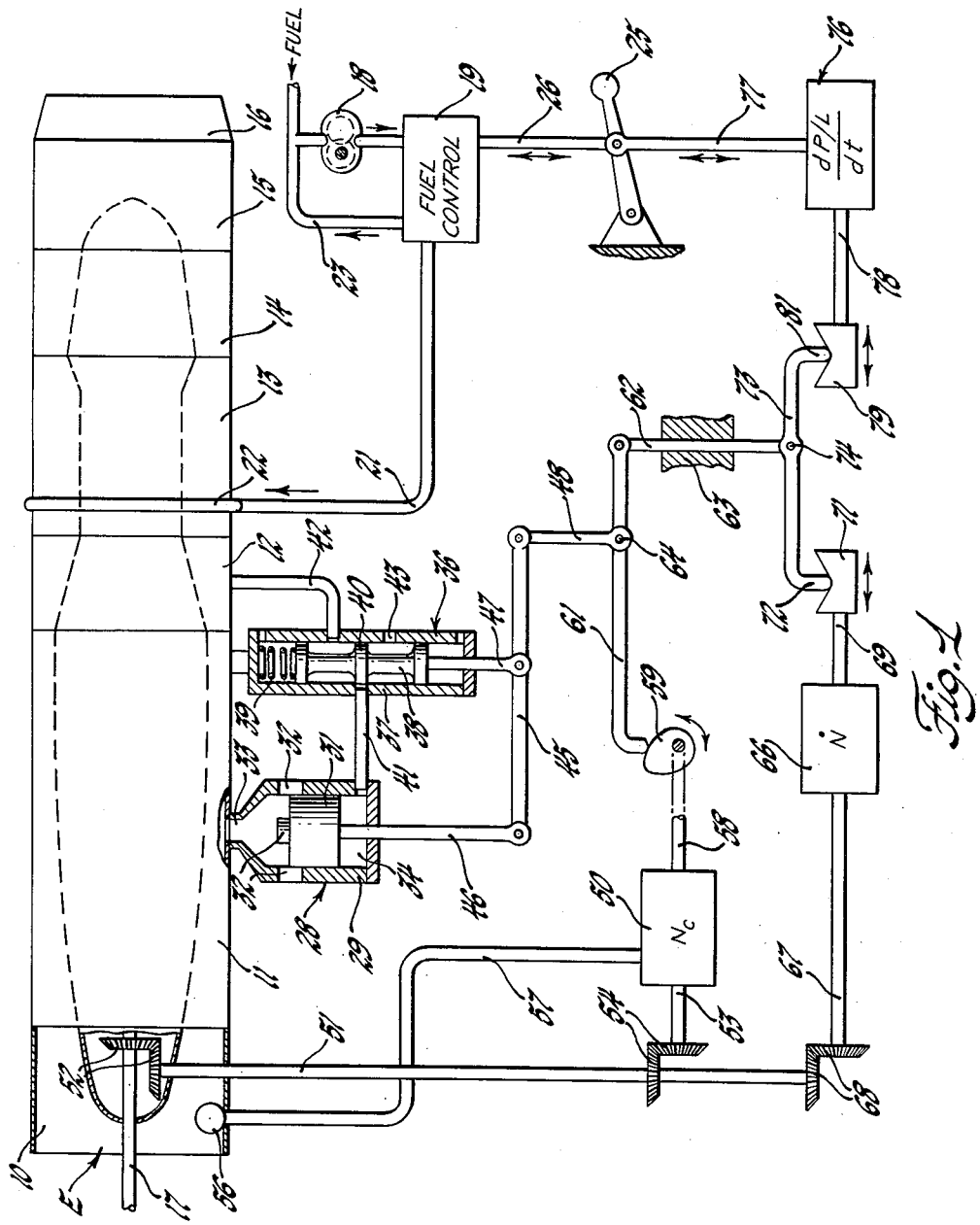
FIGURE 1 is a schematic diagram of a bleed control system associated with a gas turbine engine.

FIGURE 1 illustrates a gas turbine engine E of usual axial-flow type, the details of which are immaterial to the invention. Such engines ordinarily include an air inlet section 10, a compressor 11, a diffuser or midframe section 12, a combustion apparatus 13, a turbine 14, and an exhaust duct 15 terminating in a nozzle 16. The turbine drives the compressor, which supplies air to the combustion apparatus to provide motive fluid for the turbine. The compressor and turbine may each have a single rotor or the engine may be of the dual-spool type having two independently rotating compressors each driven by a turbine. A shaft 17 driven by the turbine may transmit the power output of the engine. On the other hand, the power output of the engine may be the generation of a high velocity jet discharged through the nozzle 16. Fuel is supplied to the combustion apparatus by any suitable mechanism, illustrated by a pump 18, which may be driven by the engine and supplies fuel through a metering fuel control 19 and a fuel line 21 to a fuel manifold 22 of the engine. Excess pumped fuel is returned to the pump inlet through a bypass line 23. The power or speed setting of the fuel control 19 is regulated by a pilot's power control lever 25 which may be connected to the fuel control by a link or rod 26. Fuel controls such as 19 ordinarily respond to a number of conditions affecting engine operation, but description of such matters immaterial to this invention is omitted.

The compressor is vented or bled by a bleed valve 28 which may be taken as illustrative of a single one or a plurality of bleed valves which may allow air to blow off from the stage or stages of the compressor at which bleeding is most beneficial in suppressing surge. The bleed valve 28 as illustrated comprises a body 29 within which is mounted a piston 31. Axial movement of the piston in the body varies the area of bleed ports 32 which vent a chamber connected to the compressor by a passage 33. The piston 31 is a servomotor actuated by the pressure at the bled stage acting in opposition to a controlled pressure in chamber 34 below the piston. This pressure is controlled by a servo control valve 36 of any suitable type. As illustrated, valve 36 comprises a body 37 within which is mounted a reciprocable valve spool 38 having three lands. Spool 38 may be biased by a spring 39. The valve is illustrated in its neutral or closed position in which the center land 40 of the spool closes a port which communicates through a conduit 41 with chamber 34. The operating medium for the servomotor, as illustrated, is high pressure air taken from the compressor outlet through a line 42 entering valve body 37 above the intermediate land 40. A vent 43 to atmosphere is provided below land 40. As will be apparent, downward movement of spool 38 supplies high pressure air to chamber 34 to move the bleed valve in the closing direction, while upward movement of spool 38 vents chamber 34 through port 43, whereupon the pressure communicated to the upper face of piston 31 through conduit 33 moves the valve in the opening direction.

A floating lever 45 is connected to a stem 46 extending from piston 31, a stem 47 extending from spool 38, and a reciprocable input or control link 48. Link 48 is coupled to control mechanism which acts through lever 45 and stem 47 to actuate the servo valve 36. The connection of lever 45 to stem 46 provides a proportional feedback such that the area of the bleed ports 32 is determined by the movement of link 48. The bleed valve and servomechanism structure just described is conventional, and is merely illustrative of suitable operating structure for the compressor bleed.

Proceeding now to the control means for the bleed valve operating servo valve and servomotor, it has been stated in the introductory part of this specification that the control is preferably responsive to corrected rotor speed, to rotor acceleration, and to some condition indicative of significant fuel rate transients. This latter means may conveniently be a mechanism which responds to movement of the power control lever 25. The actions of these three responsive mechanisms are combined to move the link 48 and thereby control the bleed area.

The means responsive to corrected rotor speed may be similar to that referred to in my U. S. Patent No. 2,941,354. It includes a servo device 50 which generates an output which is proportional to, or some definite function of, corrected rotor speed, $N_c$, and which may be of the type disclosed in U.S. Patent 2,824,426. The internal structure of this particular mechanism is described in the patent, and moreover this invention does not depend upon the structure of the particular device which generates an output representing corrected speed. The corrected speed device 50 may have an input of actual rotor speed supplied through an accessory drive shaft 51 driven at a speed proportional to actual compressor rotor speed from shaft 17 through gearing 52, and driving an input shaft 53 through gearing 54. The device 50 is also connected to a temperature bulb 56 in the engine inlet by a conduit 57. The device 50 includes responsive devices and servomotors which drive an output shaft 58 so that its angular displacement is proportional to, or is some definite function of, corrected rotor speed. A schedule of bleed valve opening as a function of corrected speed is provided by a suitably contoured cam 59 mounted on shaft 58. Cam 59 acts upon one end of a floating lever 61, the other end of which is pivoted to a reciprocable member or slider 62 guided in a fixed support 63. An intermediate point 64 of lever 61 is pivotally coupled to the lower end of link 48. For any given position of slider 62, the movement of link 48 is determined by the cam 59 and thereby by the desired function of corrected speed. Spring 39 or any other suitable means may maintain follower 61 in contact with cam 59.

Rotor acceleration, which may be represented by $\dot{N}$, and which will be referred to for conciseness as speed rate, is sensed by a suitable accelerometer and servomechanism 66. The accelerometer 66 is driven in accordance with compressor rotation by a shaft 67 coupled to the accessory drive shaft 51 by gears 68. The accelerometer provides an output in terms of linear movement of an output member 69 on which is mounted an acceleration schedule cam 71. Cam 71 cooperates with a follower 72 on one end of a floating lever 73 which is pivoted at 74 to slider 62. Movement of cam 71 moves cam follower 72, displacing slider 62, thus adding the acceleration response to the corrected speed response provided through cam 59. The nature and structure of the accelerometer are immaterial to this invention in which any suitable accelerometer may be employed. One example of such an accelerometer and servomechanism thereof is described in U.S. Patent application 760,514 filed July 11, 1958, of common ownership with this application.

The third input to the bleed valve control is provided by a device 76 responsive to transients of power lever position. As illustrated in FIGURE 1, device 76 receives an input of power lever position through a reciprocable rod 77 connected to the power control lever 25. Device 76 reciprocates an output member 78 the displacement of which is approximately proportional to acceleration of the power lever. A cam 79 on the member 78 cooperates with a follower 81 on the opposite end of floating lever 73 from the follower 72. Reciprocation of follower 81 by cam 77 is additive to movement of follower 72 in moving slider 62 and, therefore, in moving link 48. The input to the servomechanism and the resulting area of the bleed valve are an additive function of the three inputs from the devices 50, 66 and 76. It is apparent that many mechanisms may be employed to combine these inputs so as to provide the desired results.

Figure 2:
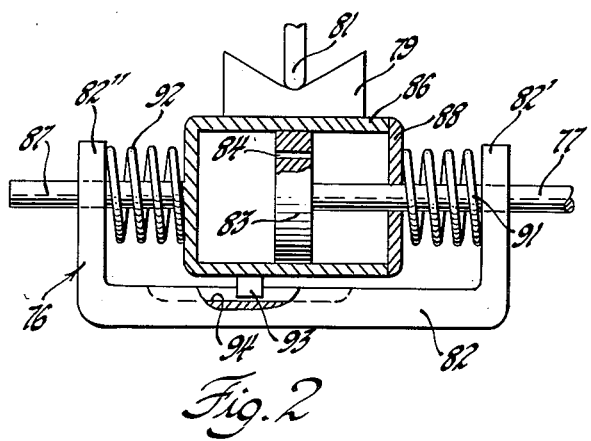
FIGURE 2 is a somewhat schematic drawing of a device responsive to transients of power lever movement, with parts cut away and in section.

The particular nature of the device responsive to power lever movements or to any other condition which serves to provide an input indicative of fuel rate transients is immaterial to the invention. A schematic illustration of one type of device which is usable for this purpose is presented in FIGURE 2. The power lever movement responsive device 76 comprises a fixed base or support 82 having upstanding arms 82' and 82". The input rod 77 of FIG. 1 is slidable in arm 82'. Rod 77 terminates in a piston 83 having a small orifice 84 connecting the faces of the piston. Piston 83 is mounted in a cylinder 86 integral with a stem 87 which is coaxial with rod 77 and is slidably mounted in arm 82". The rod 77 also is slidably guided in the head 88 of cylinder 86. A coil spring 91 is mounted between arm 82' and head 88, and a coil spring 92 is similarly mounted between the cylinder and arm 82". Suitable means, not illustrated, may be provided to insure that the cylinder 86 remains full of fluid such as fuel. As will be apparent, the piston and cylinder combination acts as a dashpot, and the axial force exerted on the cylinder by movement of the piston is a function of the velocity of the piston. This axial force is resisted by the net force of opposed springs 91 and 92 so that the displacement of the cylinder is a function of the velocity of the piston. The cam 79 previously referred to is coupled to the cylinder 86. It may be mounted on the cylinder wall as illustrated in FIGURE 2. A tooth or spline 93 extending from the cylinder 86 is guided in a keyway 94 in the support 82 to prevent rotation of the cylinder. By suitable contouring of cam 79, the displacement of follower 81 may be made to coincide sufficiently closely with the desired or scheduled response to power lever acceleration. Any suitable device for this purpose, or a device directly responsive to abrupt changes in engine fuel flow or fuel pressure, may be used.

Figure 3:
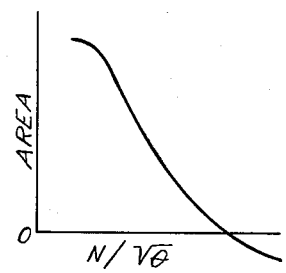
FIGURE 3 is a chart showing a schedule of bleed area as a function of corrected speed.
Figure 4:
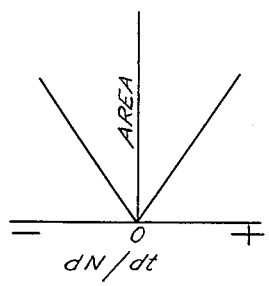
FIGURE 4 is a chart showing a schedule of bleed area as a function of compressor rotor acceleration.
Figure 5:
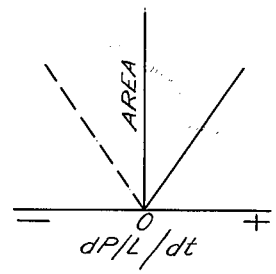
FIGURE 5 is a chart showing a schedule of bleed area as a function of acceleration of the power control lever.

FIGURES 3 to 5, inclusive, further explain the nature of the control in terms of a typical installation. These curves illustrate the scheduled responses of bleed valve area to the several controlling quantities: corrected speed in FIGURE 3, speed rate in FIGURE 4, and fuel rate as represented by power lever acceleration in FIGURE 5. The schedules will vary, depending upon the characteristics of a particular engine model with which the control is employed, the location and number of bleeds, and other such factors. These are a matter of accommodating a control to the known characteristics or surge criticality of a particular engine. As shown by FIGURE 3, the bleed valves should be open at low values of corrected speed and close at some value below the normal operating speed of the engine. In the control according to this invention, the bleed valve schedule based on corrected speed may be accurately adjusted to steady state engine operating conditions, since it is not necessary to include a substantial tolerance band to allow for the disturbing effects of speed and fuel transients.

The similar curves of FIGURES 4 and 5 indicate that, at zero speed rate and zero power lever rate, the schedule is for the bleed valve to remain closed. This zero ordinate, when added to the corrected speed curve of FIGURE 3, has no additional effect on bleed valve opening. However, an increasing bleed valve opening signal is transmitted with increase in speed rate or fuel rate, regardless of the sense of the change, that is, whether an increase or a decrease in speed or fuel is involved. The net result is that, upon the occurrence of transients, the bleed valve may be opened; and, if already open because of the corrected speed schedule, is opened further unless already wide open.

The bleed is opened for positive speed rate because of the effect of compressor acceleration on the surge line. It is opened for negative speed rate because of a transient condition due to overshoot at the termination of deceleration which tends to cause surge, and because opening the bleeds reduces engine power and assists the deceleration of the engine.

The bleed should be opened for positive fuel rate because of the increased compressor outlet pressure resulting from increase of fuel. The scheduled opening of the bleed for negative fuel rate is indicated by a broken line in FIG. 5 because this is optional. It may be included to assist in deceleration (or decrease of power output of the engine at constant speed of a turboprop engine) or to anticipate the somewhat slower response of the speed rate responsive device 66.

In some engine installations, it may be satisfactory to omit one or the other of the speed rate or fuel rate inputs. In other words, in terms of the structure shown in FIGURE 1, cam follower 72 or 81 might be replaced by a fixed pivot. Provision of either of these two inputs provides an improvement over control by corrected speed only. In most cases, however, it is desirable to have all three inputs. The speed rate input reflects the effect upon compressor performance of speed transient conditions in the compressor. The fuel rate input reflects the tendency for increase of fuel to raise compressor discharge pressure and, therefore, to stall or surge the compressor. In general, the effect of introduction of fuel is more rapid than the acceleration of the engine. For this reason, compensation for this effect by the speed rate cam is not as accurate as the result achieved by including fuel rate as a separate factor. However, in a turbojet engine in which the principal effect of a fuel change is rotor acceleration, the fuel rate cam may be omitted with some sacrifice of accuracy. Contrariwise, it may be possible to eliminate the speed rate input in engines which operate essentially at constant speed, such as some turboprop engines. In this case, the corrected speed input may be relied upon principally for bleed control during acceleration of the engine at low speeds, which is ordinarily accomplished at light load. Of course, an acceleration tolerance must be built into the corrected speed schedule in this case. Increases in power output of the engine at the constant normal operating speed may be corrected for by the power lever rate or fuel rate input. To sum it up, however, the most accurate and effective control is provided by a combination of the three inputs as shown on FIGURE 1.

Since the advantages of the mechanism and the mode of operation thereof have been recited in the foregoing description, no resume thereof appears to be needed. It may be pointed out, however, that the bleed valve or valves are opened according to a basic schedule of corrected rotor speed and are further opened in response to transients of rotor speed and fuel feed so that the bleed valve area may be very accurately adjusted to the response of the compressor not only to steady state conditions, but also to those transients which vary the operating characteristics of the compressor.

As will be apparent, if bleeds are provided at more than one compressor stage, all of the bleeds may be operated by the same control mechanism connected to them so that some fixed relation exists between the position of the control mechanism such as link 48 and the openings of the bleed valves at the several stages. For example, link 48 could also be connected to a second servo valve and a second bleed valve servomotor at any other stage of the compressor. The relative opening of the bleed valves in the two stages could be determined by the transmission from link 48 to the servo valve or by the relative contours and sizes of the bleed ports. In many engines, however, bleeding is necessary at only one stage, and illustration of the mechanism for bleed at one stage is sufficient to explain the invention.

The detailed description of the preferred embodiment of the invention to explain the principles thereof is not to be considered as limiting or restricting the invention as many modifications may be made within the scope of the invention by the exercise of skill in the art.

I claim:

1. A compressor bleed system for a gas turbine engine comprising a compressor, combustion means supplied by the compressor, a turbine supplied by the combustion means connected to drive the compressor, and means for supplying fuel to the combustion means, the bleed system comprising, in combination, at least one bleed valve connected to the compressor, means connected to the bleed valve for operating the bleed valve through a range of area from closed to open; and control means for the valve operating means including means generating a signal which is a scheduled function of corrected speed, means generating a signal which is a scheduled function of compressor acceleration, means responsive to a condition indicative of changes in engine fuel rate generating a signal which is a scheduled function of fuel rate transients, and means transmitting the signals from the said generating means to the said bleed valve operating means.

2. A system as recited in claim 1 in which the last-named means additively couples the signals.

3. A compressor bleed system for a gas turbine engine comprising a compressor, combustion means supplied by the compressor, a turbine supplied by the combustion means connected to drive the compressor, and means for supplying fuel to the combustion means, the bleed system comprising, in combination, at least one bleed valve connected to the compressor, means connected to the bleed valve for operating the bleed valve through a range of area from closed to open; and control means for the valve operating means including means responsive to compressor rotation and inlet temperature generating a signal which is a scheduled function of corrected speed, means responsive to compressor rotation generating a signal which is a scheduled function of compressor acceleration, means responsive to a condition indicative of changes in engine fuel rate generating a signal which is a scheduled function of fuel rate transients, and means transmitting the signals from the said generating means to the said bleed valve operating means.

4. A compressor bleed system for a gas turbine engine comprising a multistage compressor, combustion means supplied by the compressor, a turbine supplied by the combustion means connected to drive the compressor, and means for supplying fuel to the combustion means, the bleed system comprising, in combination, at least one bleed valve connected to the compressor, servomotor and servo valve means connected to the bleed valve for operating the bleed valve through a range of area from closed to open; and control means for the valve operating means including means responsive to compressor rotation and inlet temperature generating a signal which is a scheduled function of corrected speed, means responsive to compressor rotation generating a signal which is a scheduled function of compressor acceleration, means responsive to abrupt changes in engine fuel control setting generating a signal which is a scheduled function of power control setting transients, and means additively transmitting the signals from the said generating means to the said bleed valve operating means.

5. A compressor bleed system for a gas turbine engine comprising a compressor, combustion means supplied by the compressor, a turbine supplied by the combustion means connected to drive the compressor, and means for supplying fuel to the combustion means, the bleed system comprising, in combination, at least one bleed valve connected to the compressor, means connected to the bleed valve for operating the bleed valve through a range of area from closed to open; and control means for the valve operating means including means responsive to compressor rotation and inlet temperature generating a signal which is a scheduled function of corrected speed, means responsive to compressor rotation generating a signal which is a scheduled function of compressor acceleration, and means additively transmitting the signals from the said generating means to the said bleed valve operating means.

6. A compressor bleed system for a gas turbine engine comprising a compressor, combustion means supplied by the compressor, a turbine supplied by the combustion means connected to drive the compressor, and means for supplying fuel to the combustion means, the bleed system comprising, in combination, at least one bleed valve connected to the compressor, means connected to the bleed valve for operating the bleed valve through a range of area from closed to open; and control means for the valve operating means including means responsive to compressor rotation and inlet temperature generating a signal which is a scheduled function of corrected speed, means responsive to a condition indicative of abrupt changes in engine fuel rate generating a signal which is a scheduled function of fuel rate transients, and means additively transmitting the signals from the said generating means to the said bleed valve operating means.

7. A compressor bleed system for a gas turbine engine comprising a multistage compressor, combustion means supplied by the compressor, a turbine supplied by the combustion means connected to drive the compressor, and means for supplying fuel to the combustion means, the bleed system comprising, in combination, at least one bleed valve connected to the compressor, servomotor and servo valve means connected to the bleed valve for operating the bleed valve through a range of area from closed to open; and control means for the valve operating means including means responsive to compressor rotation and inlet temperature generating a signal which is a scheduled function of corrected speed, means responsive to abrupt changes in engine fuel control setting generating a signal which is a scheduled function of power control setting transients, and means additively transmitting the signals from the said generating means to the said bleed valve operating means.

References Cited in the file of this patent

UNITED STATES PATENTS

| | | |
|---|---|---|
| 2,785,848 | Lombard et al. | Mar. 19, 1957 |
| 2,853,851 | Chandler | Sept. 30, 1958 |
| 2,906,093 | Robinson | Sept. 29, 1959 |
| 2,930,520 | Abild | Mar. 29, 1960 |
| 2,931,168 | Alexander et al. | Apr. 5, 1960 |